United States Patent
Kawanishi et al.

(10) Patent No.: US 6,788,865 B2
(45) Date of Patent: Sep. 7, 2004

(54) POLARIZATION MAINTAINING OPTICAL FIBER WITH IMPROVED POLARIZATION MAINTAINING PROPERTY

(75) Inventors: Satoki Kawanishi, Yokohama (JP); Katsunari Okamoto, Mito (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 346 days.

(21) Appl. No.: 09/799,150

(22) Filed: Mar. 5, 2001

(65) Prior Publication Data

US 2001/0026667 A1 Oct. 4, 2001

(30) Foreign Application Priority Data

Mar. 3, 2000 (JP) ..................... P2000-058666

(51) Int. Cl.7 .............................. G02B 6/20
(52) U.S. Cl. ................... 385/125; 385/123
(58) Field of Search ................. 385/123, 124, 385/125, 127, 37, 11

(56) References Cited

U.S. PATENT DOCUMENTS

| | | | | |
|---|---|---|---|---|
| 5,802,236 A | * | 9/1998 | DiGiovanni et al. | 385/127 |
| 6,243,522 B1 | * | 6/2001 | Allan et al. | 385/123 |
| 6,334,017 B1 | * | 12/2001 | West | 385/123 |
| 6,522,433 B2 | * | 2/2003 | Kelsey et al. | 359/34 |

FOREIGN PATENT DOCUMENTS

| | | | |
|---|---|---|---|
| JP | 2000-035521 | 2/2000 | |
| JP | 2002-098852 | 4/2002 | |
| WO | WO 99/64903 | * 12/1999 | ............ G02B/6/00 |
| WO | WO 99/64904 | 12/1999 | |
| WO | WO 00/49436 | 8/2000 | |

OTHER PUBLICATIONS

Dyott, R.B., "Preservation of Polarisation in Optical–Fibre Waveguides With Elliptical Cores", *Electronics Letters*, Jun. 21, 1979, vol. 15, No. 13, pp. 380–382.

Joannopoulos, John D., et al., "Molding the Flow of Light", *Photonic Crystals*, Princeton University Press, Princeton, New Jersey (1995).

* cited by examiner

*Primary Examiner*—Edward J. Glick
*Assistant Examiner*—Chih-Cheng Glen Kao
(74) *Attorney, Agent, or Firm*—Brenda O. Holmes; Kilpatrick Stockton LLP

(57) ABSTRACT

A polarization maintaining optical fiber is formed by using a core in a cross sectional shape having different diameters along two orthogonal axes defined on a plane perpendicular to an optical axis, or a photonic crystal structure cladding having a diffraction grating with lattice intervals for realizing confinement of lights within the core which are different along two orthogonal axes defined on a plane perpendicular to an optical axis, or the photonic crystal structure cladding that is divided into four divided portions along a circumferential direction, where at least a part of lattice holes in a first pair of divided portions that are facing each other along one direction have a diameter larger than that of lattice holes in a second pair of divided portions that are facing each other along another direction orthogonal to the one direction.

2 Claims, 12 Drawing Sheets

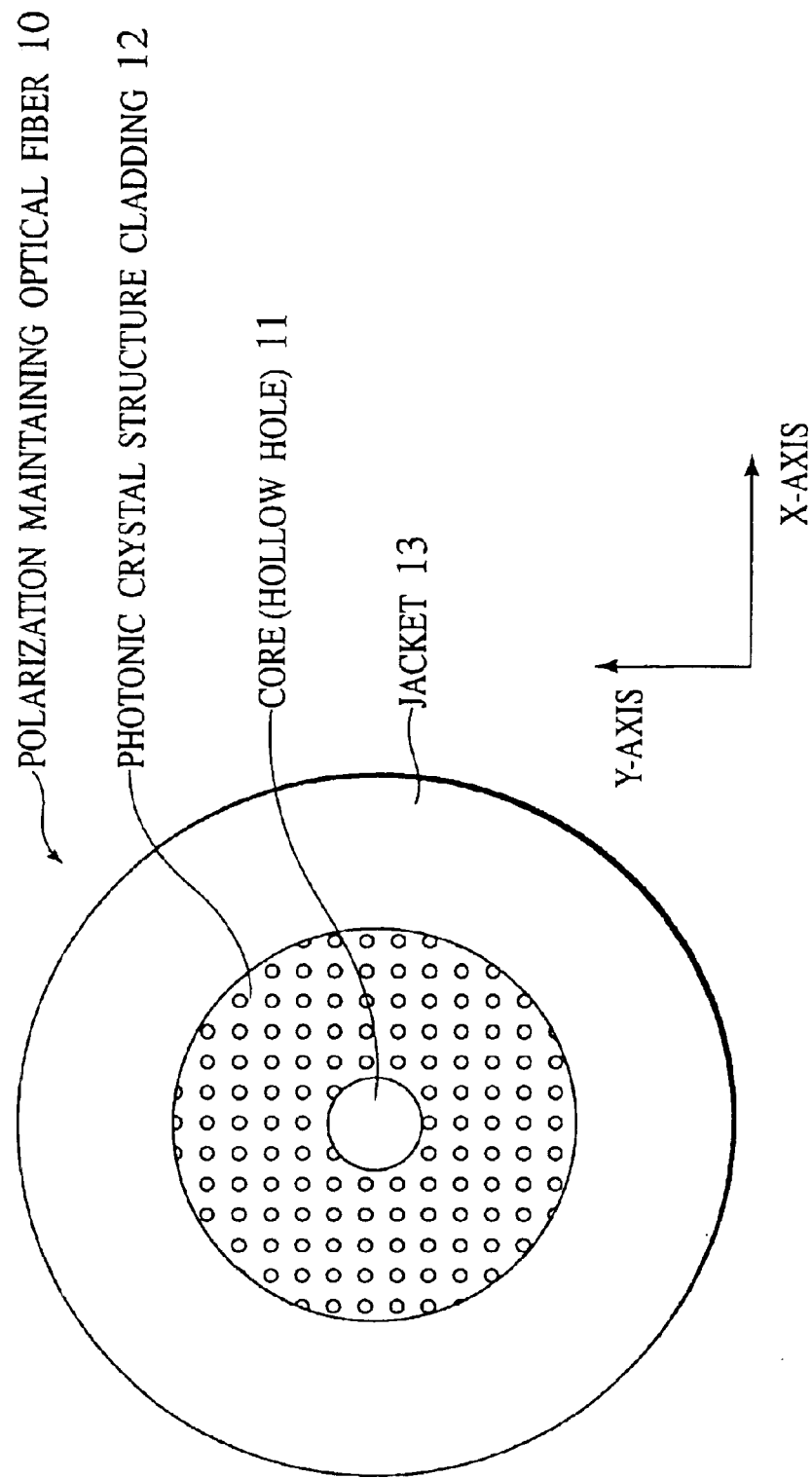

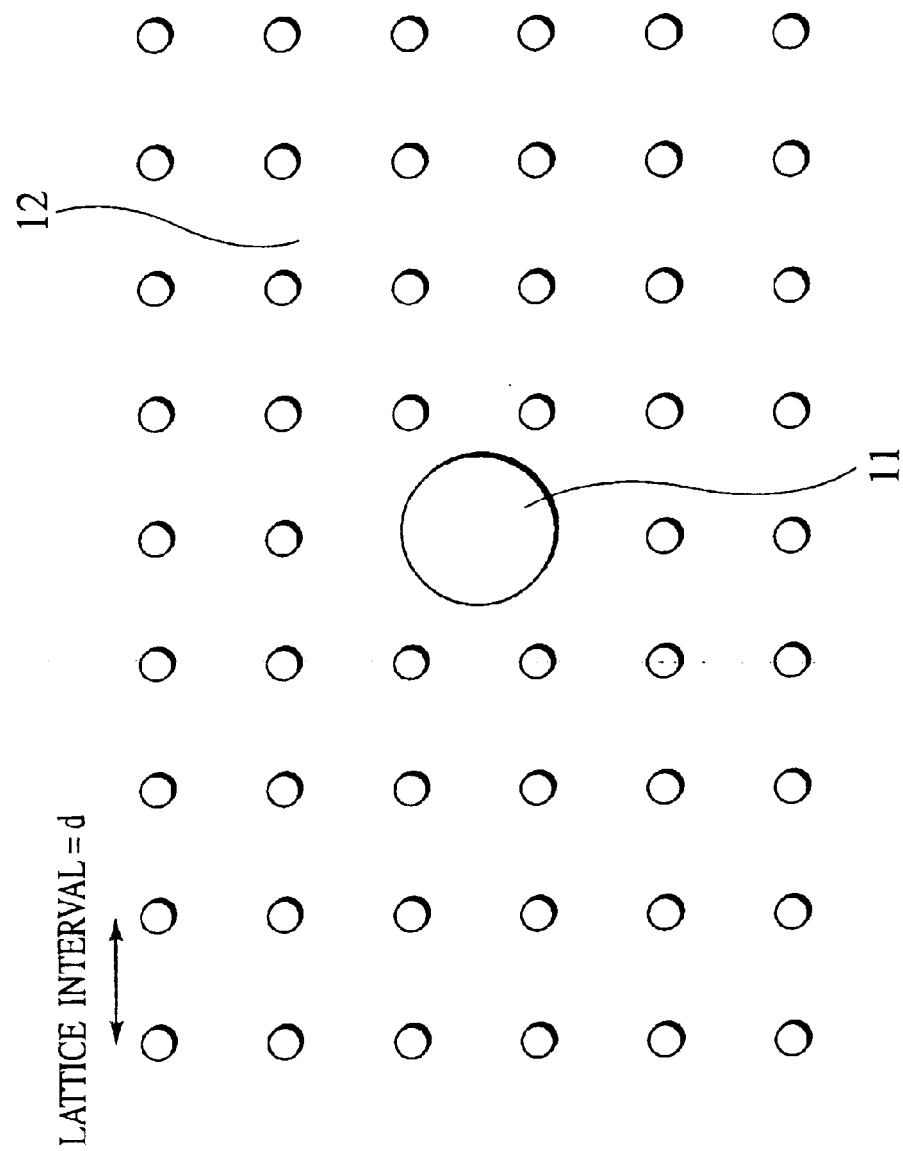

POLARIZATION MAINTAINING OPTICAL FIBER WITH IMPROVED POLARIZATION MAINTAINING PROPERTY

BACKGROUND OF THE INVENTION

1. Field of the Invention

The present invention relates to a polarization maintaining optical fiber capable of transmitting optical signals while maintaining their polarization state, which can be utilized as a transmission medium in optical communication networks and optical signal processings.

2. Description of the Background Art

FIG. 1 shows a conventional optical fiber 10 in which a core 11 in a form of a hollow hole is surrounded by a photonic crystal structure cladding 12, and this photonic crystal structure cladding 12 is further covered by a jacket 13. Note that, in the literature, a term "photonic crystal structure cladding" is used regardless of a material used for the core while a term "photonic band gap cladding" is used specifically in the case of using a hollow hole core or the core with the refractive index lower than that of the cladding, and a term "photonic crystal structure cladding" will be used throughout this specification in the former sense so that the "photonic crystal structure cladding" should be construed as including the "photonic band gap cladding".

The photonic crystal structure cladding 12 has a diffraction grating (represented by blank dots in the figure), which is usually formed by hollow holes but it can also be formed by a material with a different refractive index in circular cross sectional shapes.

Next, the principle of optical waveguiding by the optical fiber 10 in such a configuration will be described. In this optical fiber 10, in the case where the material of the core 11 is glass, the equivalent refractive index of the photonic crystal structure cladding 12 is lower than that of the core 11, so that lights are waveguided within the core 11 by the confinement due to the total reflection of the refractive index (similar to the confinement in the general single mode fiber).

On the other hand, in the case where the refractive index of the core 11 is lower than that of the photonic crystal structure cladding 12 or in the case where the core 11 is a hollow hole so that its refractive index is equal to that of the air which is approximately 1, the photonic crystal structure cladding 12 and the jacket 13 in the surrounding are formed by silica materials same as those used in the ordinary optical fiber, so that their refractive indexes are higher than that of the core (hollow hole) 11. Consequently, if the cladding in the same structure as that of the conventional optical fiber is used, the refractive index of the hollow hole core 11 would become lowest and therefore it would be impossible to confine the energy of lights within the core 11 in this structure.

For this reason, the confinement of lights is realized by adopting a structure called photonic crystal structure in part of the cladding. Namely, the photonic crystal structure cladding 12 having a diffraction grating with an appropriate lattice interval for confining lights within the core 11 is provided in the surrounding of the core (hollow hole) 11.

FIG. 2 shows a configuration of the photonic crystal structure cladding 12. In general, the three-dimensional photonic crystal structure is a diffraction grating capable of causing the Bragg reflection of lights in all directions, which is realized by setting the lattice constant (lattice interval) d of the diffraction grating d approximately equal to the wavelength of lights to be propagated through the medium (core=air), as shown in FIG. 2.

There are many possible configurations for a crystal lattice constituting the photonic crystal structure besides a square lattice shown in FIG. 2. FIG. 3 shows some exemplary configurations for a crystal lattice constituting the photonic crystal structure.

FIG. 3A shows a square shaped lattice structure (black portions in the figure) with a higher refractive index which is embedded in a medium (white portion in the figure) with a lower refractive index. FIG. 3B shows a square shaped lattice structure (white portions in the figure) with a lower refractive index which is embedded in a medium (black portion in the figure) with a higher refractive index. FIG. 3C shows a triangular shaped lattice structure (black portions in the figure) with a higher refractive index which is embedded in a medium (white portion in the figure) with a lower refractive index. FIG. 3D shows a triangular shaped lattice structure (white portions in the figure) with a lower refractive index which is embedded in a medium (black portion in the figure) with a higher refractive index. FIG. 3E shows a honeycomb shaped lattice structure (black portions in the figure) with a higher refractive index which is embedded in a medium (white portion in the figure) with a lower refractive index.

According to J. D. Joannopoulos et al., "Photonic Crystals", Princeton University Press, pp. 122–126, 1995, it is known that the photonic crystal structure is present in these configurations so that the confinement of lights can be realized.

Note also that the lattice structure with cylindrical or circular hole shaped lattice holes is assumed here, but the shape of the lattice holes is not necessarily limited to the cylindrical or circular hole shape, and the photonic crystal structure can also be realized by using the lattice structure with the lattice holes in a triangular prism or triangular hole shape, a rectangular bar or rectangular hole shape, a hexagonal bar or hexagonal hole shape, etc.

When the core in a form of a hollow hole is provided in this photonic crystal structure, lights are strongly confined within this core. Consequently, when it is desired to waveguide lights through some structure, it is possible to propagate lights while confining them within that structure (the core 11) by providing the photonic crystal structure (the photonic crystal structure cladding 12) in the surrounding of that structure (the core 11), as shown in FIG. 2.

This photonic crystal structure is provided in the surrounding of the optical fiber core to realize the confinement such that lights do not propagate in a radial direction from a center of the optical fiber core. Namely, as shown in FIG. 1, the cross section of the optical fiber 10 has a lattice shaped structure, and this same structure is maintained along the length direction. In other words, the cross section of the optical fiber 10 has a uniform structure throughout (except for a fluctuation of shape due to the fabrication process of the optical fiber) and there is no structure that is perpendicular or oblique to the length direction of the optical fiber 10. By adopting this structure, it is possible to propagate lights entered into the core 11 while confining them within the core 11.

In the conventional optical fiber 10 described above, although it is possible to transmit lights through the optical fiber while confining lights within the core 11, the following problem arises in the case of carrying out optical communications using this optical fiber 10. Namely, in the case where the shape of the core 11 of the optical fiber is circular, there is no mechanism for determining a polarization direction of lights propagating within the core 11, so that a fluctuation in the polarization direction within the core 11 can be caused by a slight fluctuation in this circular share of the core 11. Consequently, the polarization state of optical signals after transmission through the optical fiber 10 can vary due to causes such as temperature variation or vibration of the polarization maintaining optical fiber 10, and it has been necessary for a receiving side to use a polarization independent structure that is not affected by the variation of the polarization of optical signals.

The currently existing polarization maintaining optical fibers include the PANDA fiber which does not use the photonic crystal structure. The fabrication process of this PANDA fiber requires a sophisticated technique of forming holes at two locations in a vicinity of the core made by the material of the optical fiber and creating fibers by squeezing stress applying material into these holes. In particular, the process for squeezing the stress applying material is the major factor for preventing the improvement of the productivity of the PANDA fiber, and the price of the PANDA fiber is as high as 100 times or more of that of the ordinary single mode fiber. In addition, this PANDA fiber structure cannot realize a very large propagation constant difference between the orthogonal polarization modes, so that it has been difficult to realize the cross-talk of −30 dB or more between these two modes. For this reason, it is difficult to realize a long distance transmission of signal pulses while maintaining a single polarization by using the PANDA fiber, and the use of the PANDA fiber as a single polarization transmission path has not been realized so far.

SUMMARY OF THE INVENTION

It is therefore an object of the present invention to provide a polarization maintaining optical fiber capable of transmitting optical signals while maintaining the polarization of optical signals stably.

According to one aspect of the present invention there is provided a polarization maintaining optical fiber, comprising: a core in a cross sectional shape having different diameters along two orthogonal axes defined on a plane perpendicular to an optical axis; and a photonic crystal structure cladding which is provided in a surrounding of the core and having a diffraction grating with a lattice interval for realizing confinement of lights within the core.

According to another aspect of the present invention there is provided a polarization maintaining optical fiber, comprising: a core in a form of a hollow hole; and a photonic crystal structure cladding provided in a surrounding of the core and having a diffraction grating with lattice intervals for realizing confinement of lights within the core, the lattice intervals being different along two orthogonal axes defined on a plane perpendicular to an optical axis.

According to another aspect of the present invention there is provided a polarization maintaining optical fiber, comprising: a core; and a photonic crystal structure cladding provided in a surrounding of the core and having a diffraction grating with lattice intervals for realizing confinement of lights within the core, the lattice intervals being different along two orthogonal axes defined on a plane perpendicular to an optical axis; wherein the core is formed by a material having a lower refractive index than that of a material forming the photonic crystal structure cladding.

According to another aspect of the present invention there is provided a polarization maintaining optical fiber, comprising: a core; and a photonic crystal structure cladding provided in a surrounding of the core and having a diffraction grating with a lattice interval for realizing confinement of lights within the core, the photonic crystal structure cladding being divided into four divided portions along a circumferential direction, at least a part of lattice holes in a first pair of divided portions that are facing each other along one direction having a larger lattice hole diameter than a smaller lattice hole diameter of lattice holes in a second pair of divided portions that are facing each other along another direction orthogonal to the one direction, and a ratio of the larger lattice hole diameter and the smaller lattice hole diameter satisfies a condition for realizing a single peak in a light intensity distribution in a vicinity of the core.

According to another aspect of the present invention there is provided a polarization maintaining optical fiber, comprising: a core in a form of a hollow hole; and a photonic crystal structure cladding provided in a surrounding of the core and having a diffraction grating with a lattice interval for realizing confinement of lights within the core, the photonic crystal structure cladding being divided into four divided portions along a circumferential direction, and at least a part of lattice holes in a first pair of divided portions that are facing each other along one direction having a larger lattice hole diameter than a smaller lattice hole diameter of lattice holes in a second pair of divided portions that are facing each other along another direction orthogonal to the one direction.

According to another aspect of the present invention there is provided a polarization maintaining optical fiber, comprising: a core; and a photonic crystal structure cladding provided in a surrounding of the core and having a diffraction grating with a lattice interval for realizing confinement of lights within the core, the photonic crystal structure cladding being divided into four divided portions along a circumferential direction, and at least a part of lattice holes in a first pair of divided portions that are facing each other along one direction having a larger lattice hole diameter than a smaller lattice hole diameter of lattice holes in a second pair of divided portions that are facing each other along another direction orthogonal to the one direction; wherein the core is formed by a material having a lower refractive index than that of a material forming the photonic crystal structure cladding.

Other features and advantages of the present invention will become apparent from the following description taken in conjunction with the accompanying drawings.

BRIEF DESCRIPTION OF THE DRAWINGS

FIG. 1 is a cross sectional view of a conventional polarization maintaining optical fiber.

FIG. 2 is a diagram showing a configuration of a photonic crystal structure used in the conventional polarization maintaining optical fiber of FIG. 1.

DETAILED DESCRIPTION OF THE PREFERRED EMBODIMENTS

Referring now to FIG. 4 to FIG. 12, various embodiments of the polarization maintaining optical fiber according to the present invention will be described in detail.

Figure 3A:
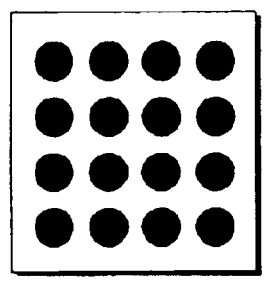
FIGS. 3A, 3B, 3C, 3D and 3E are diagrams showing some exemplary crystal lattices that can be used for the photonic crystal structure in the conventional polarization maintaining optical fiber of FIG. 1.
Figure 3B:
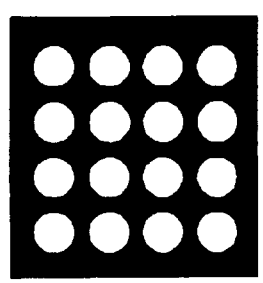
Figure 3C:
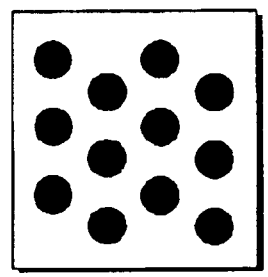
Figure 3D:
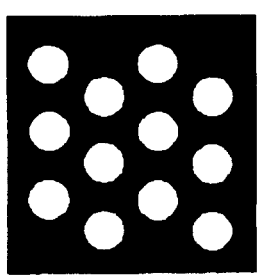
Figure 3E:
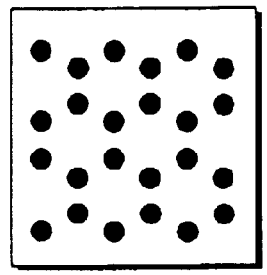
Figure 4:
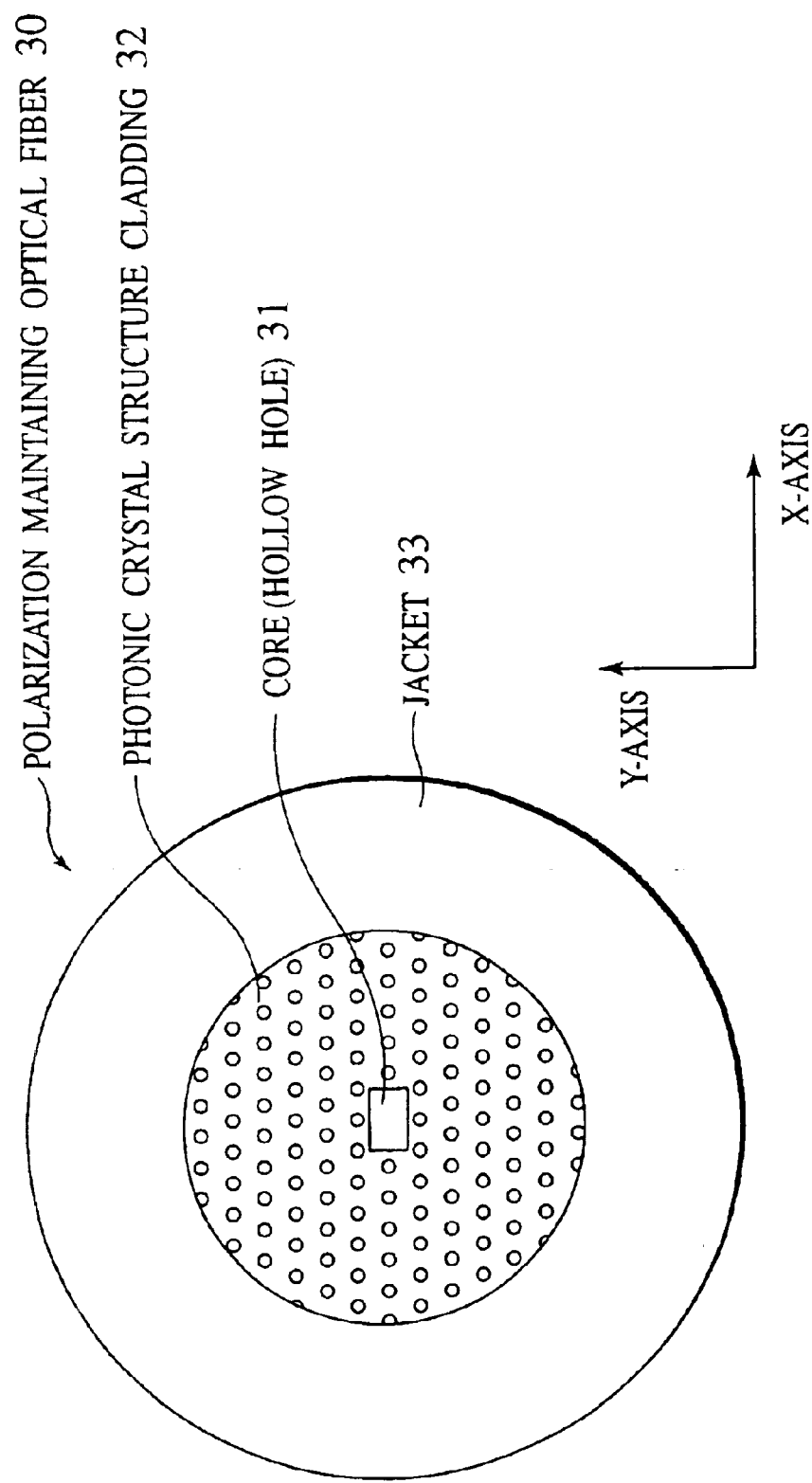
FIG. 4 is a cross sectional view of a polarization maintaining optical fiber according to the first embodiment of the present invention.

FIG. 4 shows a cross sectional view of the polarization maintaining optical fiber 30 according to the first embodiment of the present invention. This polarization maintaining optical fiber 30 is a single mode optical fiber in which a core 31 in a form of a hollow hole is surrounded by a photonic crystal structure cladding 32, and this photonic crystal structure cladding 32 is further covered by a jacket 33. The photonic crystal structure cladding 32 has a diffraction grating (represented by blank dots in the figure).

The basic light confinement effect in this polarization optical fiber 30 is the same as that of the conventional optical fiber of FIG. 1 described above. The main feature of this polarization maintaining optical fiber 30 is a shape of the core 31. Namely, the core 31 has a rectangular cross sectional shape. Because the core cross sectional shape is rectangular, the electric field of lights within the core 31 has modes in an X-axis direction and a Y-axis direction. Here, regarding the polarization of lights propagating within the core 31, a polarization direction parallel to the X-axis or the Y-axis of the core 31 is maintained, so that the polarization state after transiting from the polarization maintaining optical fiber 30 also remains stable.

Figure 5:
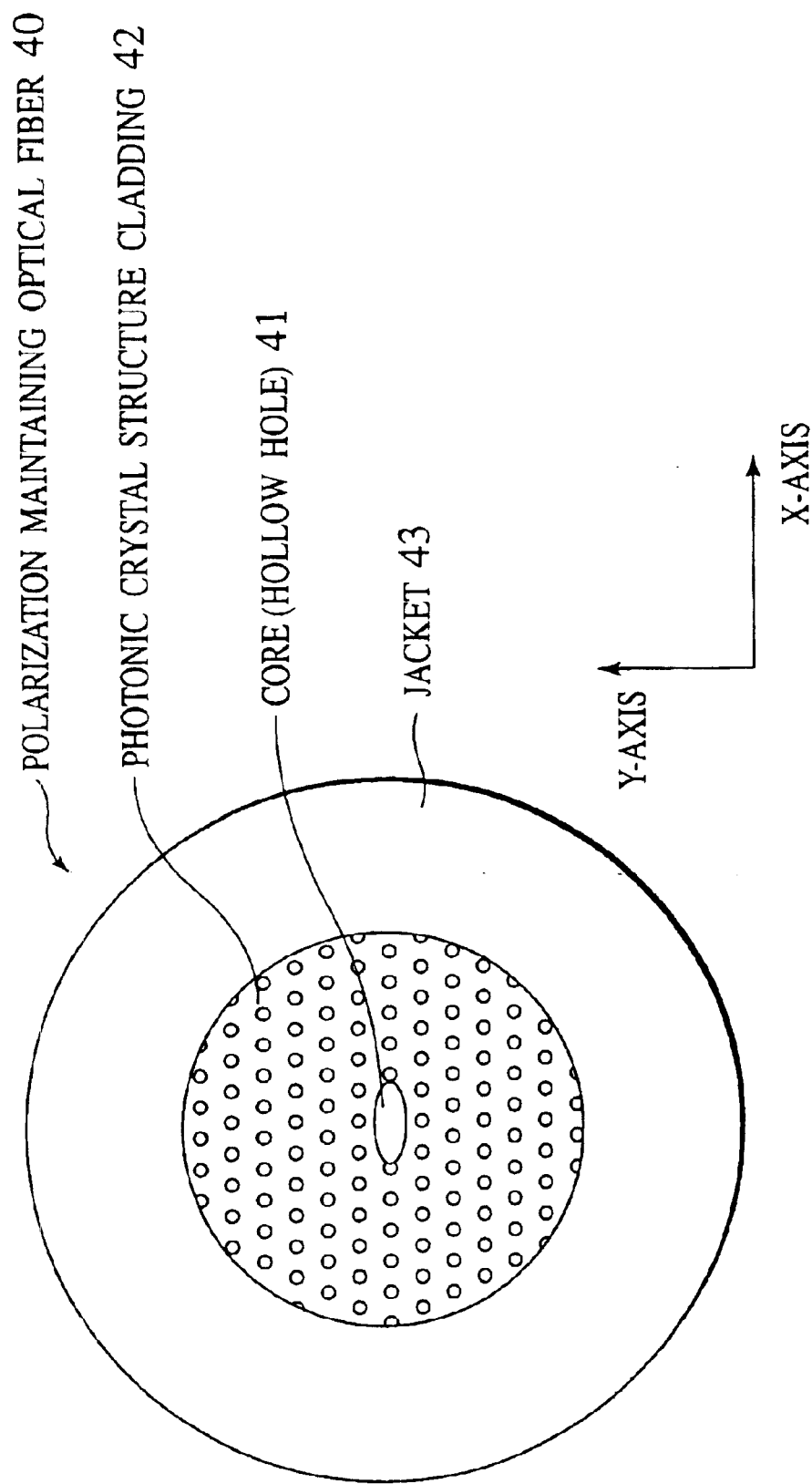
FIG. 5 is a cross sectional view of a polarization maintaining optical fiber according to the second embodiment of the present invention.

FIG. 5 shows a cross sectional view of the polarization maintaining optical fiber 40 according to the second embodiment of the present invention. This polarization maintaining optical fiber 40 is a single mode optical fiber in which a core 41 in a form of a hollow hole is surrounded by a photonic crystal structure cladding 42, and this photonic crystal structure cladding 42 is further covered by a jacket 43. The photonic crystal structure cladding 42 has a diffraction grating (represented by blank dots in the figure).

The basic light confinement effect in this polarization optical fiber 40 is the same as that of the conventional optical fiber of FIG. 1 described above. The main feature of this polarization maintaining optical fiber 40 is a shape of the core 41. Namely, the core 41 has an elliptic cross sectional shape. Because the core cross sectional shape is elliptic in which diameters in the X-axis and the Y-axis (the major axis and the minor axis) are different, there exists a state in which only a polarization in one direction along the X-axis or the Y-axis is present, and therefore the single polarization state can be maintained more stably.

Here, the principle behind the fact that the polarization can be maintained when the cross sectional shape of the core 31 or 41 is rectangular or elliptic as shown in FIG. 4 or FIG. 5, i.e., when diameters in the X-axis and the Y-axis (the fast axis and the slow axis) are different, will be described.

In the mode having a polarization parallel to the X-axis direction or the Y-axis direction, the propagation constant (that is the speed of lights propagating through the fiber) becomes different so that it becomes harder to cause an energy transfer between a polarization parallel to the X-axis and a polarization parallel to the Y-axis in the fiber (the mode coupling).

The reason why the single polarization cannot be maintained in the conventional optical fiber is that another polarization is generated by the mode coupling in the fiber even when the input is a single polarization because, denoting a difference in the propagation constant between two orthogonal modes ($HE_{11}$ x mode and $HE_{11}$ y mode) as $\delta\beta$ ($=\beta x - \beta y$), the mode coupling between these two modes occurs when there is a spatial frequency component close to or equal to $\delta\beta$ in (structural or externally caused) fluctuations along the length direction of the optical fiber.

This spatial frequency component corresponding to a fluctuation along the length direction of the optical fiber is usually a low frequency which rapidly decreases when $\delta\beta$ exceeds approximately 0.01 $cm^{-1}$. In the first and second embodiments, this mode coupling is suppressed by intentionally making $\delta\beta$ large so that there exists a state in which only a polarization in one direction is present as the entered polarization in one direction along the X-axis or the Y-axis is not converted into a component parallel to the other axis and therefore the single polarization state can be maintained.

Note that the above described principle for maintaining the polarization is also the same for the other embodiments to be described below.

Figure 6:
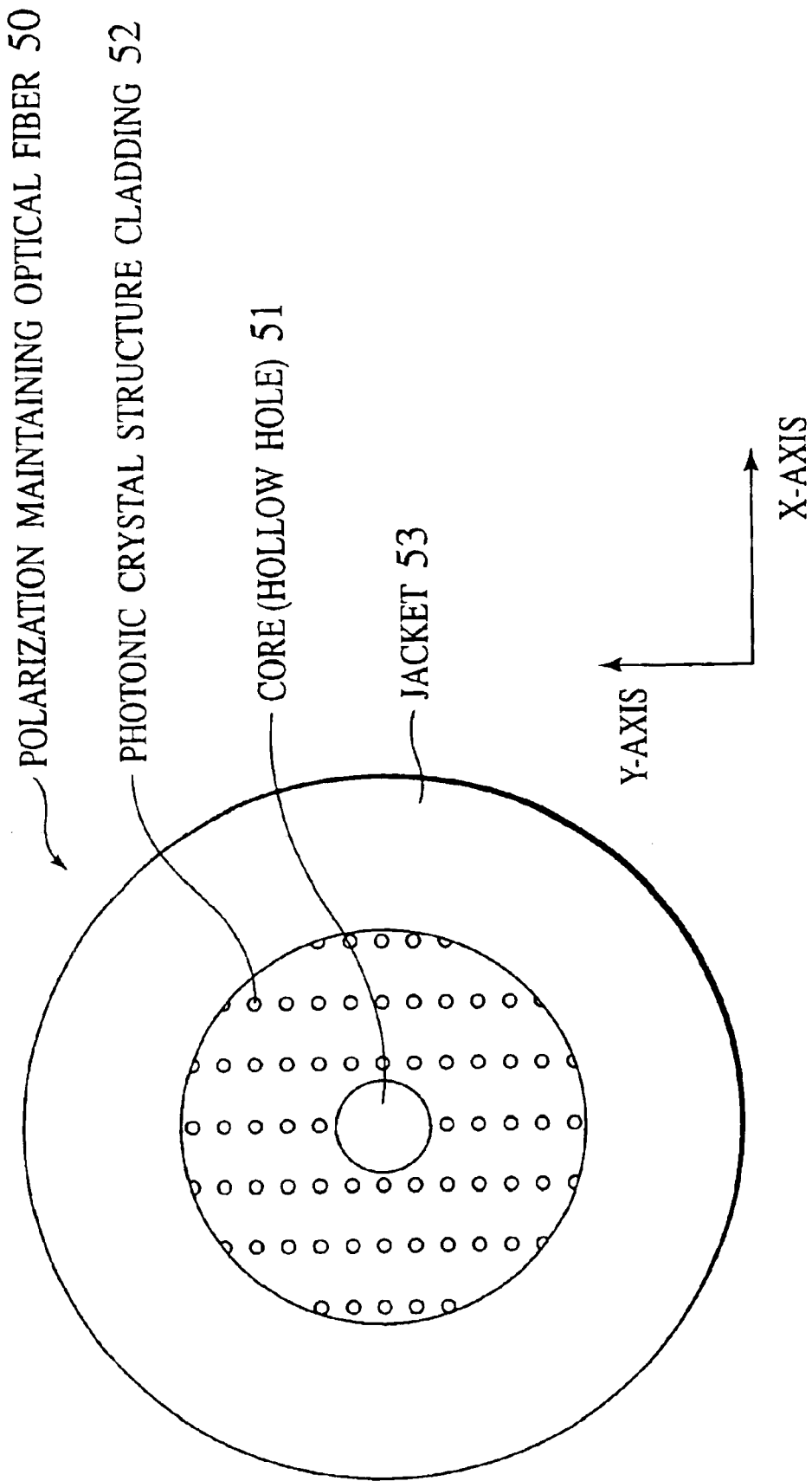
FIG. 6 is a cross sectional view of a polarization maintaining optical fiber according to the third embodiment of the present invention.

FIG. 6 shows a cross sectional view of the polarization maintaining optical fiber 50 according to the third embodiment of the present invention. This polarization maintaining optical fiber 50 is a single mode optical fiber in which a core 51 in a form of a hollow hole is surrounded by a photonic crystal structure cladding 52, and this photonic crystal structure cladding 52 is further covered by a jacket 53. Here, the basic light confinement effect in this polarization maintaining optical fiber 50 is the same as that of the conventional optical fiber of FIG. 1 described above.

In this third embodiment, the core 51 has a circular cross sectional shape. On the other hand, the photonic crystal structure cladding 52 has a diffraction grating (represented by blank dots in the figure) in which the lattice interval is different in two orthogonal directions on a plane perpendicular to the optical axis, i.e., in the X-axis direction and the Y-axis direction. Namely, the lattice interval in the X-direction is made longer than that in the Y-direction. For this reason, there exists a state in which only a polarization in one direction along the X-axis or the Y-axis is present, and therefore the single polarization state can be maintained more stably.

Figure 7:
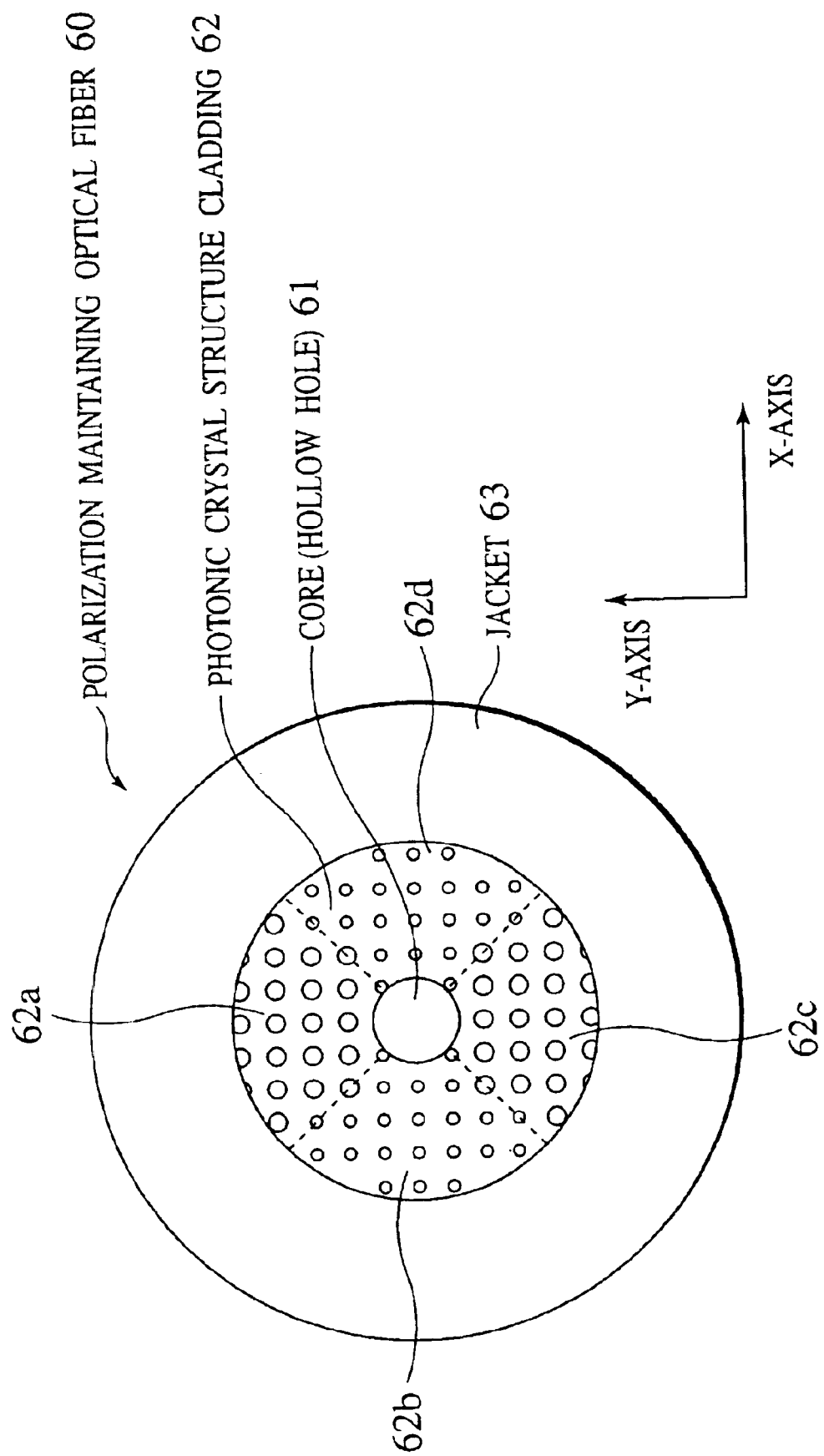
FIG. 7 is a cross sectional view of a polarization maintaining optical fiber according to the fourth embodiment of the present invention.

FIG. 7 shows a cross sectional view of the polarization maintaining optical fiber 60 according to the fourth embodiment of the present invention. This polarization maintaining optical fiber 60 is a single mode optical fiber in which a core 61 in a form of a hollow hole is surrounded by a photonic crystal structure cladding 62, and this photonic crystal structure cladding 62 is further covered by a jacket 63. Here, the basic light confinement effect in this polarization optical fiber 60 is the same as that of the conventional optical fiber of FIG. 1 described above.

In this fourth embodiment, the core 61 has a circular cross sectional shape. On the other hand, the photonic crystal structure cladding 62 has a square shaped diffraction grating arrangement (represented by blank dots in the figure) and is divided into four divided portions 62a, 62b, 62c and 62d along the circumferential direction. In these divided portions 62a, 62b, 62c and 62d, the lattice interval between lattice holes is the same, but diameters of lattice holes are larger in a first pair of the divided portions 62a and 62c that are facing each other along the Y-axis, and are smaller in a second pair of the divided portions 62b and 62d that are facing each other along the X-axis. Note that the lattice is usually formed by hollow holes but it can also be formed by a material with a different refractive index in circular cross sectional shapes.

Here, the diameters of lattice holes in the first pair of the divided portions 62a and 62c that are facing each other along the Y-axis are made larger while the diameters of lattice holes in the second pair of the divided portions 62b and 62d that are facing each other along the X-axis are made smaller as described above, so that there exists a state in which only a polarization in one direction along the X-axis or the Y-axis is present, and therefore the single polarization state can be maintained more stably.

It is to be noted that, in the first to fourth embodiments described above, the core is assumed to be a hollow hole, but the similar effect can also be obtained by using the core that is formed by a material which has a lower refractive index than that of a material forming the photonic crystal structure cladding.

Figure 8:
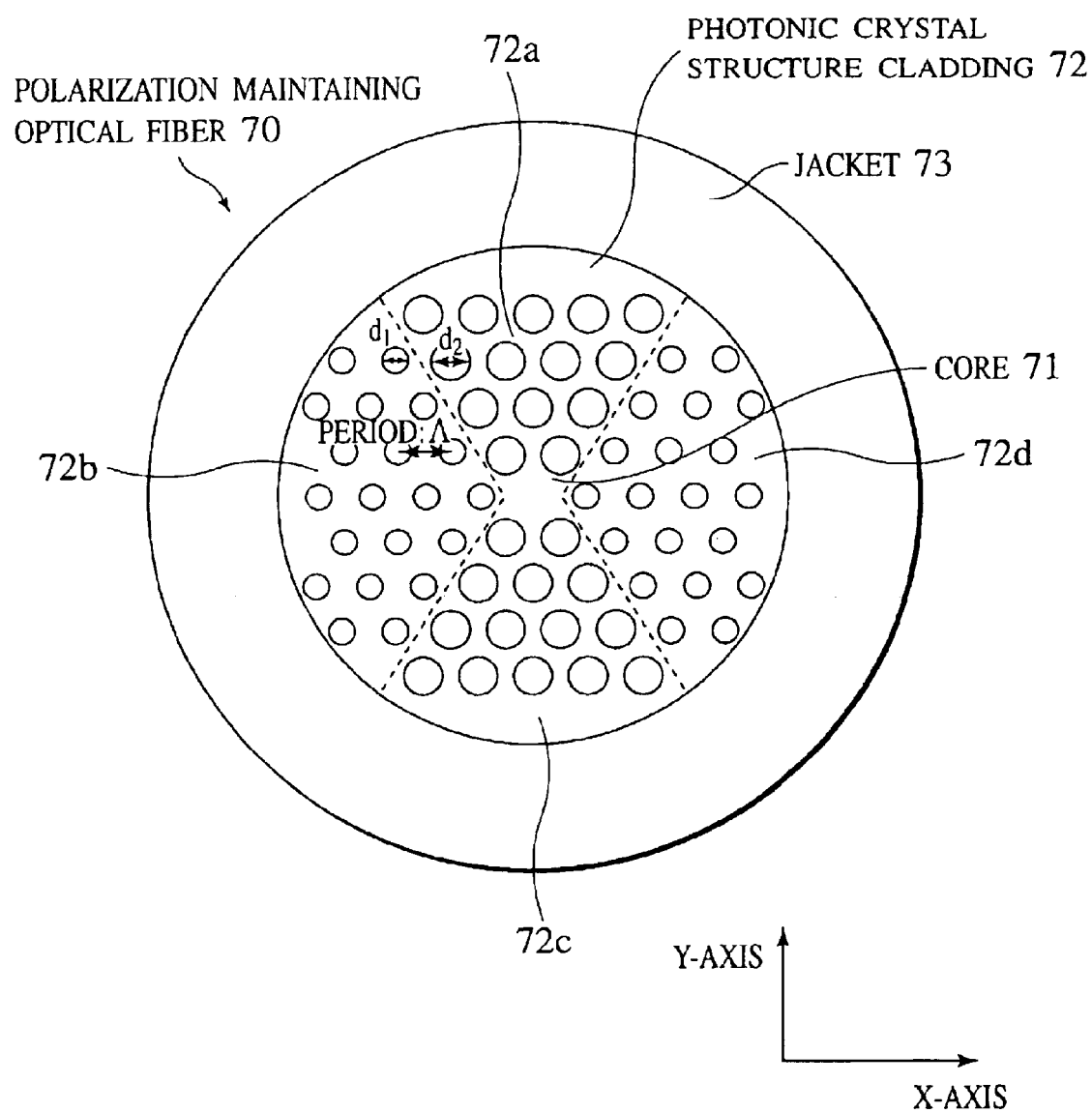
FIG. 8 is a cross sectional view of a polarization maintaining optical fiber according to the fifth embodiment of the present invention.

FIG. 8 shows a cross sectional view of the polarization maintaining optical fiber 70 according to the fifth embodiment of the present invention. This polarization maintaining optical fiber 70 is a single mode optical fiber in which a core 71 is surrounded by a photonic crystal structure cladding 72, and this photonic crystal structure cladding 72 is further covered by a jacket 73. Here, the basic light confinement effect in this polarization optical fiber 70 is the same as that of the conventional optical fiber of FIG. 1 described above.

In this fifth embodiment, the core 71 has a circular cross sectional shape. On the other hand, the photonic crystal structure cladding 72 has a triangular shaped diffraction grating arrangement (represented by blank dots in the figure) and is divided into four divided portions 72a, 72b, 72c and 72d along the circumferential direction. In these divided portions 72a, 72b, 72c and 72d, the lattice interval $\Lambda$ between lattice holes is the same, but diameters $d_2$ of lattice holes in a first pair of the divided portions 72a and 72c that are facing each other along the Y-axis are made larger than diameters $d_1$ of lattice holes in a second pair of the divided portions 72b and 72d that are facing each other along the X-axis ($d_2 > d_1$).

In this way, there is a difference in the propagation constant along the X-axis direction and the Y-axis direction so that the polarization maintaining property can be realized.

The polarization maintaining optical fiber of the fifth embodiment can be realized in the following three types according to the form of the core 71.

(1) A type where the core is a hollow hole:

In this case, the difference in the propagation constant inside the fiber is given by a radio of two different diameters of lattice holes, so that the shape of the core 71 is not limited to any specific shape and can be square, rectangular or elliptic, but it is generally convenient to use a circular shape from a viewpoint of the fabrication process.

(2) A type where the core is a material with a lower refractive index than that of a material forming the photonic crystal structure cladding:

In this case, again, the difference in the propagation constant inside the fiber is given by a radio of two different diameters of lattice holes, so that the shape of the core 71 is not limited to any specific shape and can be square, rectangular or elliptic, but it is generally convenient to use a circular shape from a viewpoint of the fabrication process.

(3) A type where the core is the same material as the photonic crystal structure cladding:

In this case, the shape of the core 71 is defined by a region enclosed by the closest lattice holes.

In this regard, PCT application publication No. WO 00/49436 already discloses an optical fiber using a filled glass core in which the polarization maintaining property based on at-most-two-fold rotational symmetry of the fiber is realized by setting diameters of lattice holes of the photonic crystal structure differently along directions of two orthogonal axes, but this document gives no specific range for the value of the ratio of two different diameters of lattice holes that is practically utilizable. However, this ratio of two different diameters of lattice holes not only directly affects the polarization maintaining property of the optical fiber but also affects the light intensity distribution within the core. In other words, when this ratio exceeds a certain value, the confinement of lights at sides with the smaller lattice hole diameter becomes weak so that the light intensity distribution is distorted.

Figure 9A:
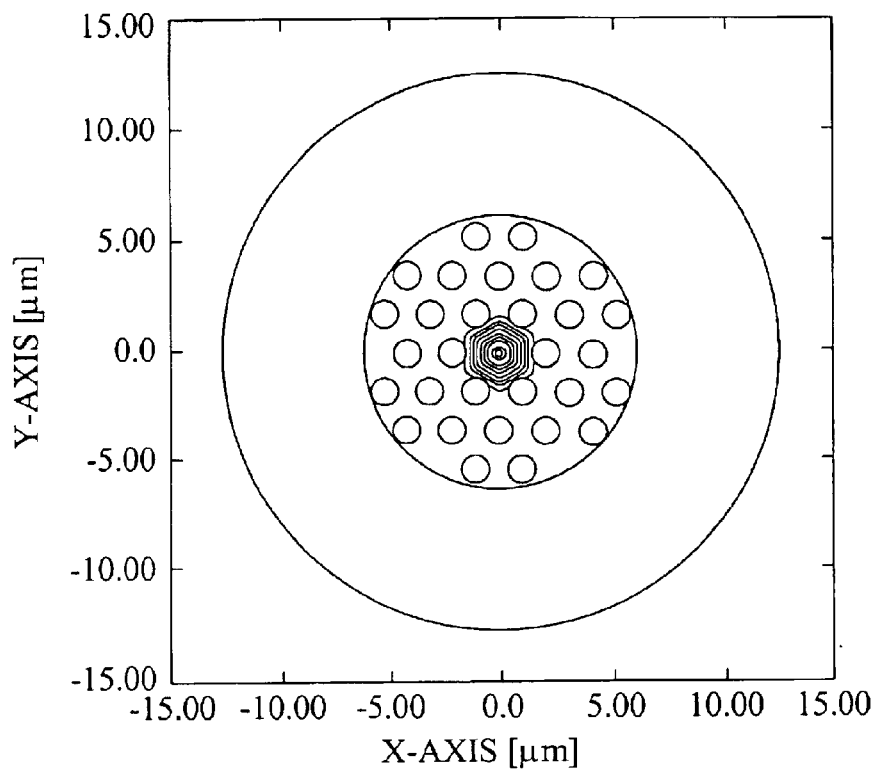
FIGS. 9A and 9B are diagrams showing a light intensity distribution in a vicinity of the core in the polarization maintaining optical fiber of FIG. 8 for two extreme cases exhibiting a single peak and double peaks.
Figure 9B:
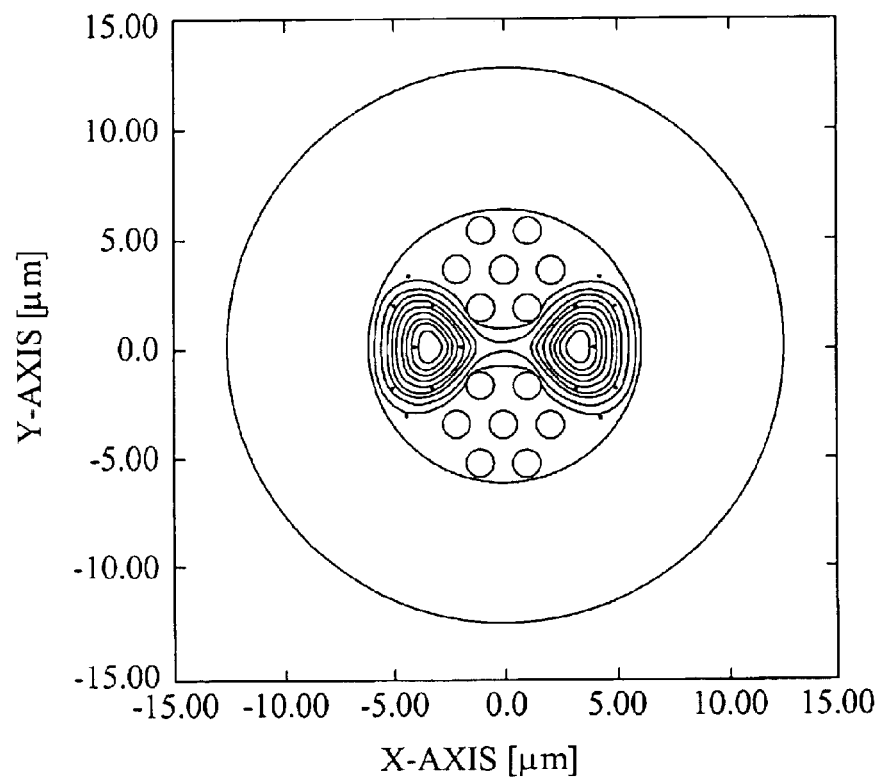

FIGS. 9A and 9B show two cases of the light intensity distribution in the core region obtained by the numerical analysis method called finite element method, where one isometric line is drawn for each 10% change of the light intensity. In the calculation, it is assumed that the lattice interval $\Lambda$ is approximately equal to twice the wavelength of lights to be propagated through the fiber, or more specifically $\Lambda = 2$ $\mu$m and the wavelength of lights is equal to 0.85 $\mu$m. FIG. 9A shows the case where the light intensity distribution in a vicinity of the core exhibits a single peak ($d_1/\Lambda = 0.6$, $d_2/\Lambda = 0.9$), and FIG. 9B shows the case where the light intensity distribution in a vicinity of the core exhibits double peaks ($d_1/\Lambda 0.1$, $d_2/\Lambda = 0.9$).

In the case of FIG. 9A, the light intensity distribution in a vicinity of the core has nearly the same shape as that of the conventional optical fiber so that the conventional optical fiber can be connected with low loss. In contrast, in the case of the light intensity distribution shown in FIG. 9B, it is difficult to connect the conventional optical fiber with low loss, and there is even a possibility for the radiation of lights to outside of the fiber when the fiber is bent, for example, because of the insufficient confinement of lights at portions where the lattice holes have smaller diameters.

In this embodiment, a condition on the lattice hole diameters for realizing the single peak in the light intensity distribution in a vicinity of the core is specified as follows.

Figure 10:
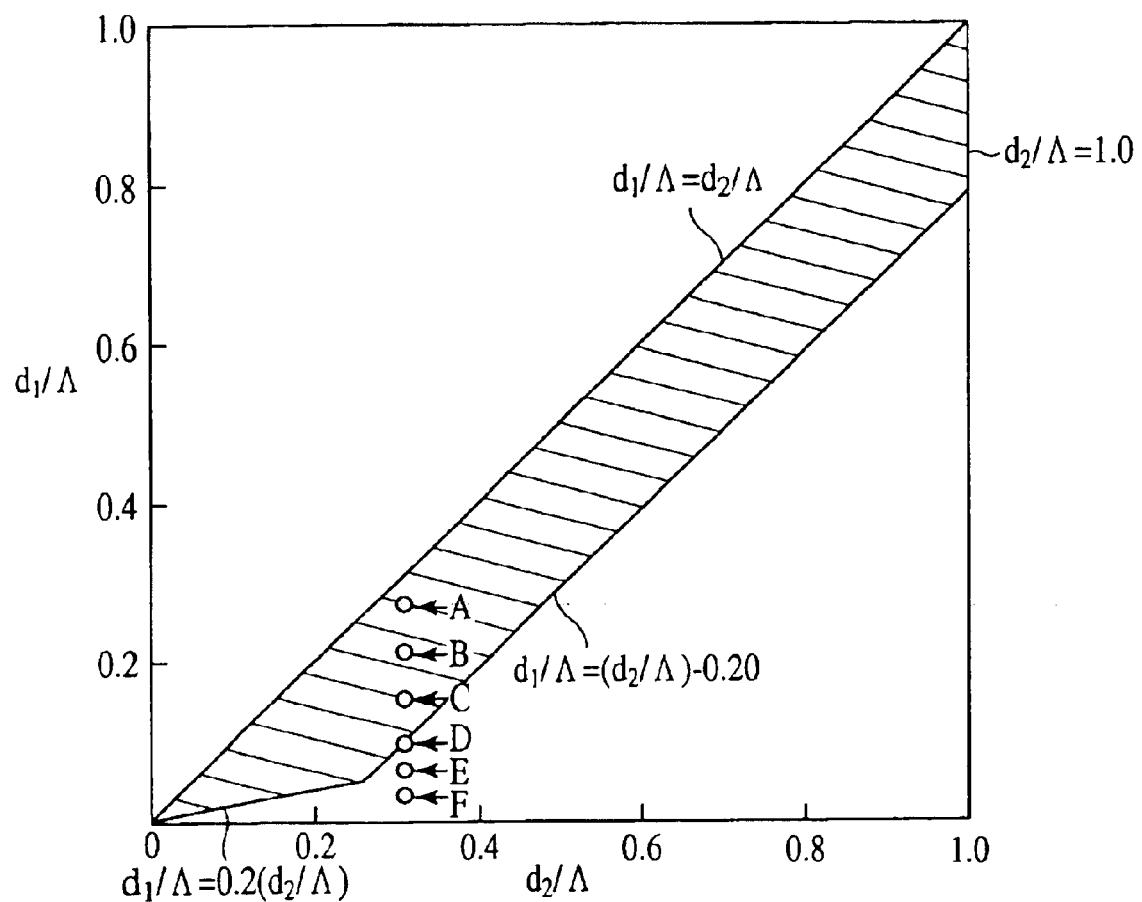
FIG. 10 is a graph indicating a range of lattice hole diameters for realizing a single peak in a light intensity distribution in a vicinity of the core in the polarization maintaining optical fiber of FIG. 8, for two exemplary cases.
Figure 11A:
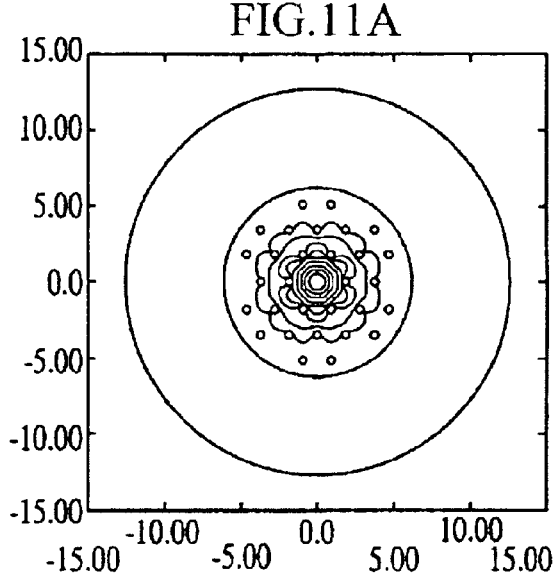
FIGS. 11A, 11B, 11C, 11D, 11E and 11F are diagrams showing a light intensity distribution in a vicinity of the core in the polarization maintaining optical fiber of FIG. 8 for six different values of the lattice hole diameters indicated in FIG. 10.
Figure 11D:
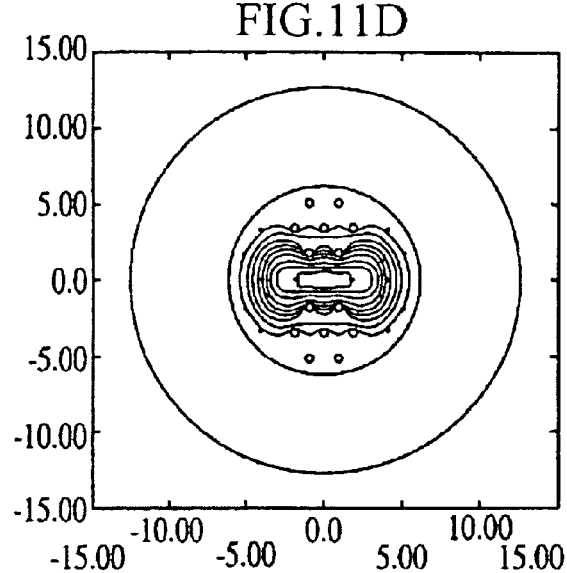
Figure 11B:
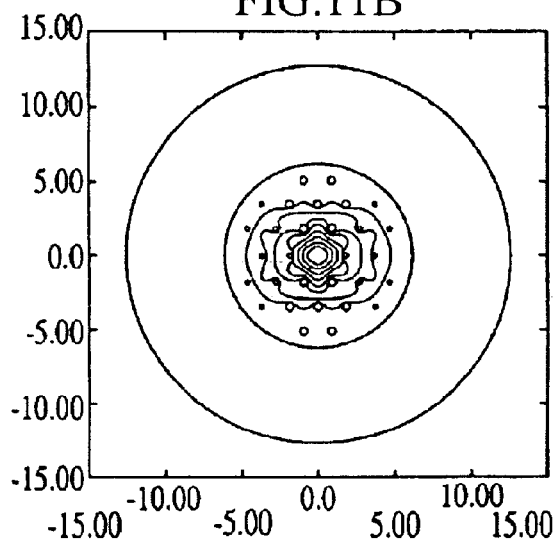
Figure 11E:
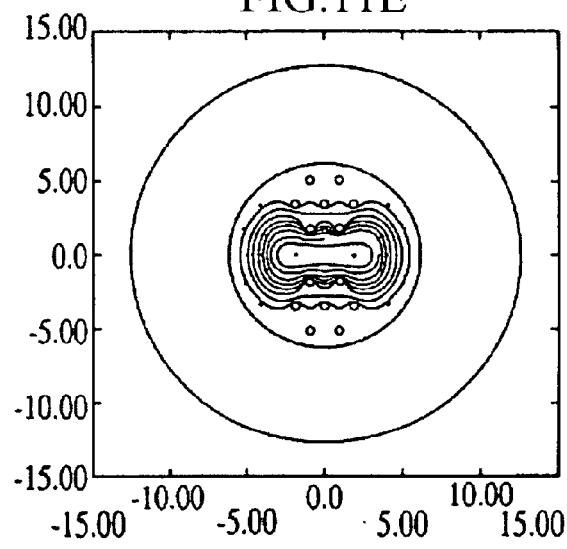
Figure 11C:
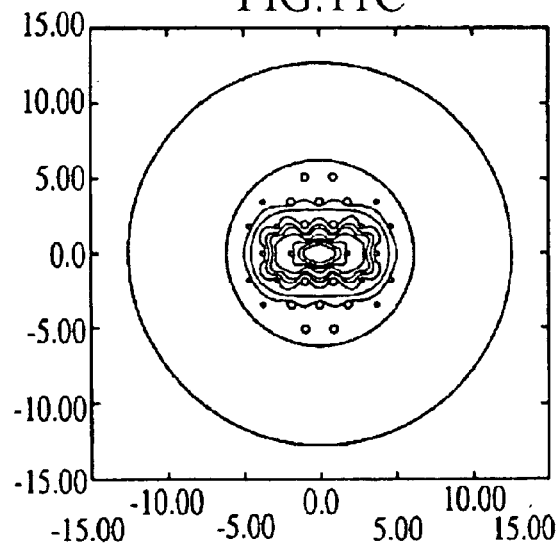
Figure 11F:
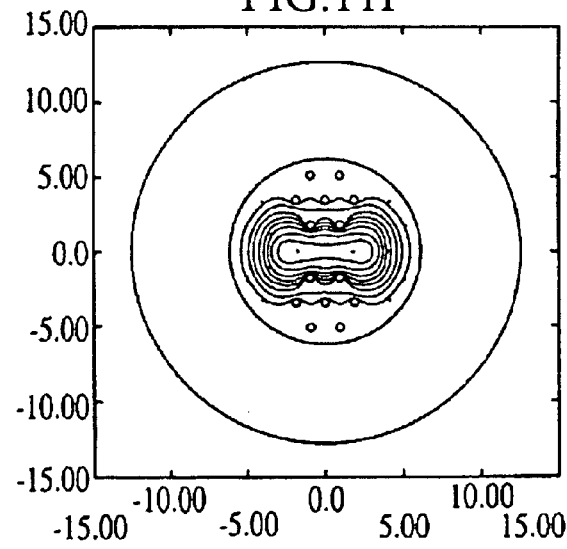

FIG. 10 shows a range of $d_1/\Lambda$ and $d_2/\Lambda$ for realizing the single peak in the light intensity distribution in a vicinity of the core. In FIG. 10, the horizontal axis represents $d_2/\Lambda$, the vertical axis represents $d_1/\Lambda$, and a shaded region indicates a range for realizing the single peak in the light intensity distribution in a vicinity of the core. Note that $d_2 > d_1$ by definition, so that only a region below a straight line $d_2 = d_1$ is significant in each part of FIG. 10. As can be seen from FIG. 10, the single peak in the light intensity distribution can be realized only within a limited range, and the single peak in the light intensity cannot be realized for an excessively large ratio of $d_2$ and $d_1$ so that the sufficient confinement of lights cannot be realized in the optical fiber for these values.

In the exemplary case of $\Lambda=2$ μm, this range for realizing the single peak can be expressed as a region enclosed by four straight lines given by the following equations.

$$d_1/\Lambda = d_2/\Lambda \quad (1)$$

$$d_1/\Lambda = 0.2(d_2/\Lambda) \quad (2)$$

$$d_1/\Lambda = d_2/\Lambda - 0.20 \quad (3)$$

$$d_2/\Lambda = 1.0 \quad (4)$$

The range for realizing the single peak can vary slightly when the lattice interval $\Lambda$ and the wavelength of lights are changed, but it is basically a part of the region below $d_1/\Lambda = d_2/\Lambda$ as shown in FIG. 10.

FIGS. 11A, 11B, 11C, 11D, 11E and 11F show six cases of the light intensity distribution obtained by using values of points A to F indicated in FIG. 10. As can be seen from FIGS. 11A–11F, the light intensity distributions for points A to D (FIGS. 11A, 11B, 11C and 11D) show a clear single peak, but the light intensity distribution for the point E (FIG. 11E) show that a central region of lights begin to split, and the light intensity distribution for the point F (FIG. 11F) show that a central region of lights that is elongated along the X-axis becomes larger than the core region so that there are clear double peaks.

Thus the practical polarization maintaining optical fiber according to this embodiment can be obtained by setting diameters of the lattice holes within a range for realizing the single peak as shown in FIG. 10.

Figure 12:
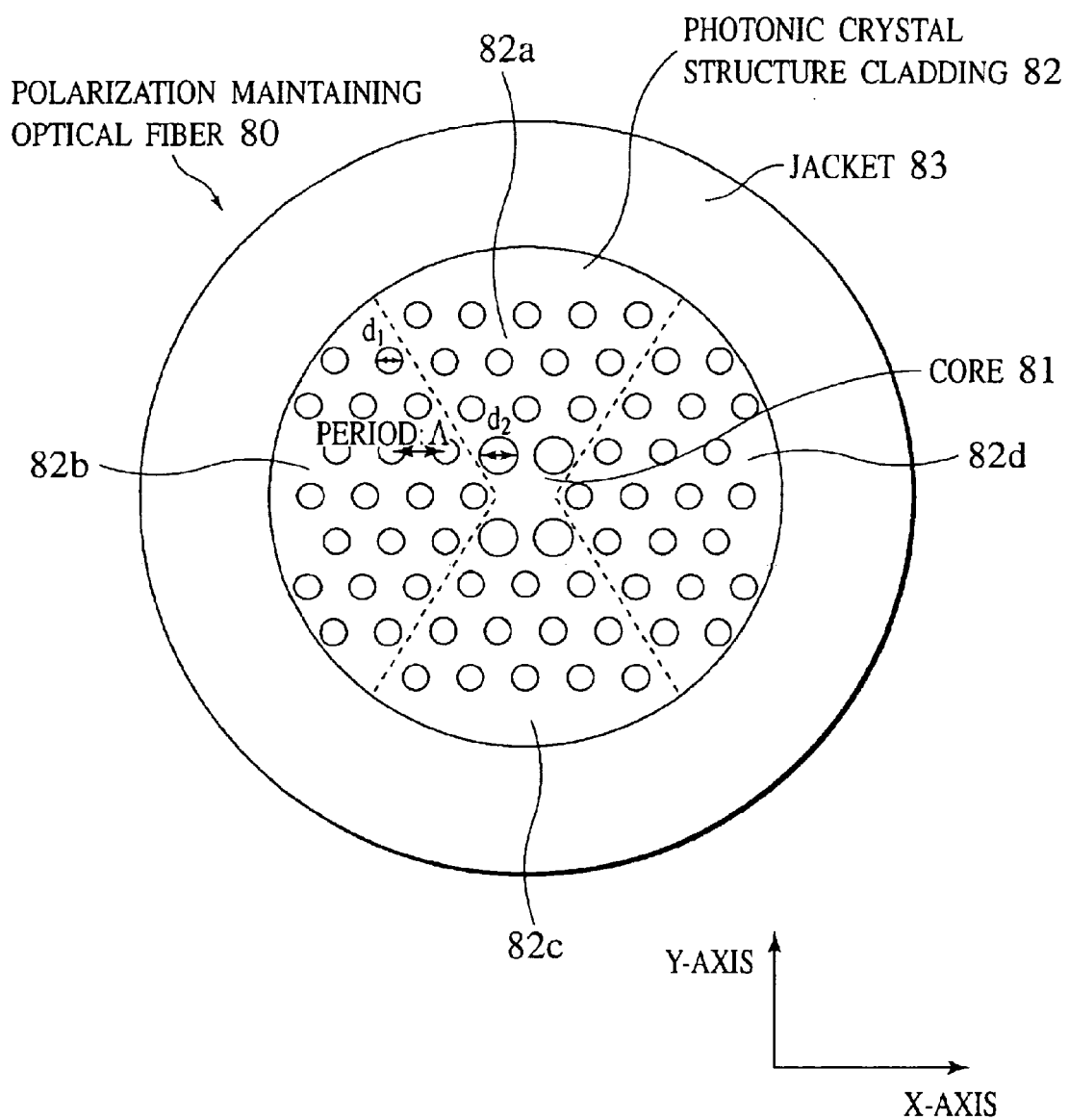
FIG. 12 is a cross sectional view of a polarization maintaining optical fiber according to the sixth embodiment of the present invention.

FIG. 12 shows a cross sectional view of the polarization maintaining optical fiber 80 according to the sixth embodiment of the present invention. This polarization maintaining optical fiber 80 is a single mode optical fiber in which a core 81 is surrounded by a photonic crystal structure cladding 82, and this photonic crystal structure cladding 82 is further covered by a jacket 83. Here, the basic light confinement effect in this polarization optical fiber 80 is the same as that of the conventional polarization maintaining optical fiber of FIG. 1 described above.

In this sixth embodiment, the core 81 has a circular cross sectional shape. On the other hand, the photonic crystal structure cladding 82 has a triangular shaped diffraction grating (represented by blank dots in the figure) and is divided into four divided portions 82a, 82b, 82c and 82d along the circumferential direction. In these divided portions 82a, 82b, 82c and 82d, the lattice interval $\Lambda$ between lattice holes is the same, but diameters $d_2$ of at least a part of lattice holes in a first pair of the divided portions 82a and 82c that are facing each other along the Y-axis are made larger than diameters $d_1$ of lattice holes in the rest of the first pair of the divided portions 82a and 82c and in a second pair of the divided portions 82b and 82d that are facing each other along the X-axis ($d_2 > d_1$).

More specifically, in this sixth embodiment, only four lattice holes closest to the core 81 in the first pair of the divided portions 82a and 82c that are facing each other along the Y-axis have the diameters $d_2$ that are larger than the diameters $d_1$ of the other lattice holes. In this case, the number of lattice holes that have the larger diameters $d_2$ can be suppressed to the minimum so that it is more convenient for purpose of the fabrication compared with the fifth embodiment described above.

The polarization maintaining optical fiber of the sixth embodiment can also be realized in the three types (1), (2) and (3) described above for the fifth embodiment. In the case of type (3), a range for realizing the single peak in the light intensity distribution in a vicinity of the core is similar to that described above for the fifth embodiment. Namely, as shown in FIG. 9A, when the condition on the lattice hole diameters for realizing the single peak in the light intensity distribution in a vicinity of the core is satisfied, the majority of the light intensities are present in the core region so that a region for using the larger lattice hole diameter can be limited to an immediate vicinity of the core region as shown in FIG. 12.

As described, according to the present invention, the photonic crystal structure is used in the cladding in order to confine lights within the core, and a rectangular or elliptic shape is adopted for the cross sectional shape of the core, so that it is possible to transmit optical signals while maintaining the polarization of the optical signals in the optical fiber. As a result, it becomes possible to realize a transmission of the high speed and high power lights while maintaining the polarization, and it becomes possible to use an optical signal processing circuit in a simpler configuration.

Also, according to the present invention, in the polarization maintaining optical fiber with the core in a circular cross sectional shape, the lattice interval of the photonic crystal structure cladding is set to be different in two orthogonal axial directions, or the photonic crystal structure cladding is divided into four portions along the circumferential direction, and diameters of at least a part of lattice holes in a first pair of divided portions that are facing each other along one direction are made larger than diameters of lattice holes in a second pair of divided portions that are facing each other along another direction, so that it is possible to transmit optical signals while maintaining the polarization of the optical signals in the optical fiber. As a result, it becomes possible to realize a transmission of the high speed and high power lights while maintaining the polarization, and it becomes possible to use an optical signal processing circuit in a simpler configuration.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A polarization maintaining optical fiber, comprising:
   a core; and
   a photonic crystal structure cladding provided in a surrounding of the core and having a diffraction grating with a lattice interval $\Lambda$ for realizing confinement of light within the core, the photonic crystal structure cladding being divided into four divided portions along a circumferential direction, all lattice holes in a first pair of divided portions that are facing each other along one direction having a larger lattice hole diameter $d_2$ than a smaller lattice hole diameter $d_1$ of all lattice holes in a second pair of divided portions that are facing each other along another direction orthogonal to the one direction, and in a graph in which a vertical axis represents $d_1/\Lambda$ and a horizontal axis represents $d_2/\Lambda$, a ratio of the larger lattice hole diameter $d_2$ and the smaller lattice hole diameter $d_1$ takes a value within a region enclosed by four straight lines given by four equations:

$d_1/\Lambda = d_2/\Lambda$ $d_1/\Lambda = 0.2(d_2/\Lambda)$ $d_1/\Lambda = d_2/\Lambda - 0.20$ $d_2/\Lambda = 1.0$ as a condition for realizing a single peak in a light intensity distribution in a vicinity of the core.

2. A polarization maintaining optical fiber, comprising:

a core; and a photonic crystal structure cladding provided in a surrounding of the core and having a diffraction grating with a lattice interval $\Lambda$ for realizing confinement of light within the core, the photonic crystal structure cladding being divided into four divided portions along a circumferential direction, only lattice holes closest to the core among lattice holes in a first pair of divided portions that are facing each other along one direction having a larger lattice hole diameter $d_2$ than a smaller lattice hole diameter $d_1$ of all other lattice holes among the lattice holes in the first pair of divided portions, all lattice holes in a second pair of divided portions that are facing each other along another direction orthogonal to the one direction having the smaller lattice hole diameter $d_1$, and in a graph in which a vertical axis represents $d_1/\Lambda$ and a horizontal axis represents $d_2/\Lambda$, a ratio of the larger lattice hole diameter $d_2$ and the smaller lattice hole diameter $d_1$ takes a value within a region enclosed by four straight lines given by four equations:

$d_1/\Lambda = d_2/\Lambda$ $d_1/\Lambda = 0.2(d_2/\Lambda)$ $d_1/\Lambda = d_2/\Lambda - 0.20$ $d_2/\Lambda = 1.0$ as a condition for realizing a single peak in a light intensity distribution in a vicinity of the core.

\* \* \* \* \*